(No Model.)
A. W. STOKES.
APPARATUS FOR DETERMINING FAT IN MILK.
No. 602,780. Patented Apr. 19, 1898.
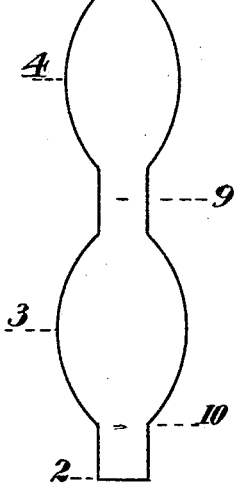
Witnesses
B. S. Ober.
Henry Orth
Inventor
Alfred Walter Stokes
by Henry Orth
Atty.

UNITED STATES PATENT OFFICE.

ALFRED WALTER STOKES, OF LONDON, ENGLAND, ASSIGNOR TO THE R. A. LISTER & COMPANY, LIMITED, OF DURSLEY, ENGLAND.

APPARATUS FOR DETERMINING FAT IN MILK.

SPECIFICATION forming part of Letters Patent No. 602,780, dated April 19, 1898.

Application filed October 27, 1897. Serial No. 656,567. (No model.) Patented in England June 24, 1895, No. 12,184.

*To all whom it may concern:*

Be it known that I, ALFRED WALTER STOKES, F. C. S., F. I. C., a subject of the Queen of Great Britain and Ireland, and a resident of London, England, have invented a certain new and useful Apparatus for Determining Volumetrically the Amount of Fat in Milk or other Matter, (for which I have obtained a patent in Great Britain, No. 12,184, bearing date June 24, 1895,) of which the following is a specification.

By means of this apparatus the amount of fat in milk or other matter can be volumetrically determined in a ready manner and without the aid of any special measuring appliance, and it can also after use be readily and thoroughly emptied and cleaned.

Figure 1 is a longitudinal section of the apparatus; Fig. 2, a section through a cap for closing one end, and Fig. 3 an elevation of a stopper for closing the other end.

The apparatus consists of a glass tube open at both ends for thorough cleaning and formed near one end with a much narrower part 5, which is marked off with gage indications or calibrated to show in percentages and in tenths of a per cent. the fat in the milk or other matter. In the other part the tube is expanded or bulb-shaped in two places—viz., at 3 and at 4—so that it may there contain a larger quantity of the liquids to be used than the rest of the tube. One end of the tube can be closed by an india-rubber or other stopper 1, and the other end by a screwed cap 7, with india-rubber pad within. The screw-thread 6 may be formed on the glass tube or on a metal or other collar fixed thereon. Instead of the screw I may use a bayonet-joint. The tube is marked in three places—viz., at 8, 9, and 10—so that the exact quantities of the liquids may be poured in by hand without the use of a special measuring vessel, thus saving much time and trouble.

The method of using the apparatus when applied to the testing of fat in milk is as follows: The screw-cap 7 is screwed on tightly. Then some amylic alcohol is poured in at the mouth 2, with that end up, till it reaches in the tube up to the mark 8. This measures, say, one and one-half cubic centimeters. Next sulfuric acid of a specific gravity of from 1.820 to 1.830 is poured into the tube up to the mark 9. This measures thirteen and one-half cubic centimeters of sulfuric acid. The milk or other liquid is then poured in up to the mark 10. This measures fifteen cubic centimeters of the milk. The stopper 1 is then tightly fitted into the mouth 2, so that a space of about one cubic centimeter is left between it and the milk, and the whole apparatus is well shaken for about a minute till the fluids are well mixed, the screw-cap being meanwhile slightly eased to allow for escape of surplus gas. The apparatus should now at once be rotated in any suitable centrifugal machine at five hundred revolutions or more per minute. If it be so rotated, the calibrated end 5 6 being placed nearest to the center of rotation, it will be found at the end of about five minutes that the fat has separated out as an oily column in the calibrated part 5. Its percentage may readily be ascertained by counting the divisions of the part 5 that it occupies, each of which divisions represents one-tenth of one per cent., by weight, of fat. The screw-cap 7 may either be taken off or be left on during the rotation, and the reading of the percentage of fat is made with the screw-cap end uppermost, as in Fig. 1.

In default of a centrifugal apparatus the tube should after mixing be immersed with its contents into water at a temperature of 65° to 82° centigrade, the screw-cap end being vertically uppermost. If kept at this temperature for at least an hour, the fat will rise into the calibrated part 5 of the apparatus and can there be read off.

After each testing operation the tube should be emptied and cleaned out, which can be easily and thoroughly effected by removing the stopper 1 and the screw-cap 7 and then washing out with hot water.

Having thus described my invention, what I claim as new therein, and desire to secure by Letters Patent, is—

1. Apparatus for determining volumetrically the proportion of fat in milk, consisting of an open-ended straight glass tube having in the order named a terminal chamber, a contracted graduated length, a second chamber, a contracted portion, a third chamber and a contracted portion, said second and third chambers each of greater capacity than the first, in combination with means for closing the open ends of the tube, substantially as set forth.

2. Apparatus for determining volumetrically the proportion of fat in milk, consisting of an open-ended straight glass tube having in the order named a terminal chamber, a contracted graduated length, a second chamber, a contracted graduated portion of greater diameter than the first graduated portion, and a third chamber terminating in a contracted graduated portion, said third chamber of greater capacity than the first or second and said second chamber of greater capacity than said first, in combination with means for closing the open ends of the tube, substantially as and for the purpose set forth.

ALFRED WALTER STOKES.

Witnesses:
V. JENSEN,
FREDK. HARRIS.